United States Patent
Park et al.

(10) Patent No.: US 7,968,232 B2
(45) Date of Patent: Jun. 28, 2011

(54) CATHODE AND LITHIUM BATTERY INCLUDING THE SAME

(75) Inventors: Kyu-sung Park, Suwon-si (KR); Dong-min Im, Gwancheon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 106 days.

(21) Appl. No.: 12/183,102

(22) Filed: Jul. 31, 2008

(65) Prior Publication Data

US 2009/0075165 A1  Mar. 19, 2009

(30) Foreign Application Priority Data

Sep. 19, 2007  (KR) .................. 10-2007-0095416

(51) Int. Cl.
- H01M 4/48 (2010.01)
- H01M 4/50 (2010.01)
- H01M 4/58 (2010.01)
- H01M 4/583 (2010.01)
- H01M 4/525 (2010.01)
- H01M 10/052 (2010.01)

(52) U.S. Cl. ............ 429/231.5; 429/221; 429/223; 429/224; 429/326; 429/330; 429/337; 429/231.8; 429/231.95

(58) Field of Classification Search .......... 429/129, 429/231.5, 188, 231.1, 221, 223, 224, 326, 429/330, 337, 231.8, 231.95; 427/77; 148/518; 423/306; 29/623.1, 623.5

See application file for complete search history.

(56) References Cited

U.S. PATENT DOCUMENTS

| | | | | |
|---|---|---|---|---|
| 5,567,210 A | * | 10/1996 | Bates et al. | 29/623.5 |
| 6,030,421 A | * | 2/2000 | Gauthier et al. | 29/623.1 |
| 2005/0098242 A1 | * | 5/2005 | Hossick-Schott et al. | 148/518 |
| 2005/0244321 A1 | * | 11/2005 | Armand et al. | 423/306 |
| 2006/0046143 A1 | * | 3/2006 | Nakai et al. | 429/231.1 |

FOREIGN PATENT DOCUMENTS

| | | | | |
|---|---|---|---|---|
| JP | 54060421 A | * | 5/1979 | |
| JP | 09293508 A | * | 11/1997 | |
| JP | 2000268812 A | * | 9/2000 | |

OTHER PUBLICATIONS

Abstract of JP 54060421 A, Tatsuo et al., May 1979.*
Machine Translation of JP 2000268812 A, Kweon et al., Sep. 2000.*
Abstract of JP 2000268812 A, Kweon et al., Sep. 2000.*
Machine Translation of JP 09293508, Yamaura K, Nov. 1997.*
Abstract of JP 09293508, Yamaura K, Nov. 1997.*
"Synthesis and characterization of layer structured solid solutions in the system of LiCoO2—Li2MnO3", Numata et al., Solid State Ionics 117 (1999) 257-263.*
Fang et al., "Synthesis and structural, electrochromic characterization of pulsed laser deposited vanadium oxide thin films", J. Vac. Sci. Tech. A 19(3) May/Jun. 2001, 887-892.*
Livage J., "Optical and Electrical properties of vanadium oxides synthesized from alkoxides", Coordination Chemistry Reviews, 190-192, 1999, 391-403.*

* cited by examiner

*Primary Examiner* — Jonathan Crepeau
*Assistant Examiner* — Kenneth Douyette
(74) *Attorney, Agent, or Firm* — Christie, Parker & Hale, LLP

(57) ABSTRACT

A cathode active material composition of a cathode of a lithium battery includes a conducting agent, a binder, and a cathode active material coated on one surface of a current collector, wherein the cathode active material composition is coated with a vanadium oxide.

14 Claims, 4 Drawing Sheets

CATHODE AND LITHIUM BATTERY INCLUDING THE SAME

CROSS-REFERENCE TO RELATED PATENT APPLICATION

This application claims the benefit of Korean Patent Application No. 2007-95416, filed on Sep. 19, 2007, in the Korean Intellectual Property Office, the disclosure of which is incorporated herein in its entirety by reference.

BACKGROUND OF THE INVENTION

1. Field of the Invention

Aspects of the present invention relate to a cathode and a lithium battery including the same, and more particularly, to a cathode having a high capacity and conductivity and a lithium battery including the same.

2. Description of the Related Art

Generally, an oxide such as $LiNiO_2$, $LiCoO_2$, $LiMn_2O_4$, $LiFePO_4$, $LiNi_xCo_{1-x}O_2$ (x=1, 2), and $LiNi_{1-x-y}Co_xMn_yO_2$ (0≤x≤0.5, 0≤y≤0.5) has been used as a cathode active material for lithium batteries.

A high capacity lithium battery can be developed by improving the efficiency and capacity of the cathode active material. A high capacity lithium battery is desirable for complex and highly functional portable electronic devices. Accordingly, it is desirable to develop better materials for lithium batteries.

For example, a variety of materials having high capacity such as composite oxides are used as cathode active materials. Among the composite oxides, for example, there is $xLi_2MO_3/(1-x)LiMeO_2$, which basically includes $Li_2MO_3$ and $LiMeO_2$. However, some composite oxides have disadvantages. In $Li_2MnO_3$, for example, the initial oxidation state of Mn is +4, and the oxidation-reduction potential of $Mn^{4+/5+}$ is below the balance band and thus Mn cannot contribute to improving the electrical conductivity. In addition, in a solid solution composition that may be used in practice, the amount of lithium is about 10-20% of the transition metal layer due to overlithiation, and the amount of Mn is at least twice as much as the amount of lithium. Thus, a only a small amount of the transition metal is used in electrical conductivity, thereby decreasing electrical conductivity.

Thus, it is desirable to improve the conductivity of various cathode active materials including such a composite oxide. Attempts have been made to improve the conductivity of the cathode active material by increasing the efficiency of the cathode active material by mixing the cathode active material with a material having excellent conductivity, and by employing a material having excellent conductivity as a conducting agent included in the cathode. However, there is still a need to develop a high capacity lithium battery.

SUMMARY OF THE INVENTION

Aspects of the present invention provide a cathode having high capacity with improved conductivity.

Aspects of the present invention also provide a lithium battery including the cathode.

Aspects of the present invention also provide a method of preparing the cathode.

According to an embodiment of the present invention, there is provided a cathode formed by coating a cathode active material composition comprising a conducting agent, a binder, and a cathode active material on one surface of a current collector, wherein the cathode active material composition is coated with a vanadium oxide.

According to an aspect of the present invention, the vanadium oxide may be $VO_x$ (2≤x<2.5) or $V_2O_5$.

According to an aspect of the present invention, the vanadium oxide may be $V_2O_5$.

According to an aspect of the present invention, the amount of the vanadium oxide may range from 0.1 to 10 parts by weight based on 100 parts by weight of the cathode active material composition.

According to an aspect of the present invention, the charge and discharge range of the cathode active material may be about 1.5 to 4.0 V vs. $Li/Li^+$.

According to an aspect of the present invention, the cathode active material may be at least one selected from the group consisting of the compounds represented by Formulae 1 to 4 below:

$$xLi_2MO_3/(1-x)LiMeO_2 \qquad \text{Formula 1}$$

wherein 0<x<1,

M is at least one metal selected from the group consisting of Mn, Ti, and Zr, and Me is at least one metal selected from the group consisting of Ti, V, Cr, Mn, Fe, Co, Ni, Cu, Al, Mg, Zr, and B;

$$Li_{1+a}Fe_{1-b}M'_bPO_4 \qquad \text{Formula 2}$$

wherein −0.1<a<0.1,

0≤b≤1, and

M' is at least one metal selected from the group consisting of Mn, Co, and Ni;

$$Li_{1+c}(Ni_{0.5}Mn_{0.5})_{1-d}Co_dO_2 \qquad \text{Formula 3}$$

wherein −0.1<c<0.1, and

0≤d≤1; and $$Li_{1+e}Mn_{2-e}O_4 \qquad \text{Formula 4}$$

wherein 0≤e≤0.33.

According to an aspect of the present invention, the cathode active material may be a compound represented by Formula 1 below:

$$xLi_2MO_3/(1-x)LiMeO_2 \qquad \text{Formula 1}$$

wherein 0<x<1,

M is at least one metal selected from the group consisting of Mn, Ti, and Zr, and Me is at least one metal selected from the group consisting of Ti, V, Cr, Mn, Fe, Co, Ni, Cu, Al, Mg, Zr, and B.

Me may be at least one metal selected from the group consisting of Cr, Mn, Co, and Ni X may range from 0.1 to 0.6.

According to another embodiment of the present invention, there is provided a cathode of a lithium battery comprising a cathode active material comprising a lithium metal oxide or lithium metal oxide composite; and a vanadium oxide coated on the cathode active material.

According to another embodiment of the present invention, there is provided a lithium battery comprising the cathode as described above; an anode; and an organic electrolytic solution.

According to another embodiment of the present invention, there is provided a method of preparing a cathode, the method comprising: forming a cathode active material composition layer by coating a slurry comprising a binder, a conducting agent, a cathode active material, and an organic solvent on a current collector, and drying the resultant; forming a cathode precursor by applying a vanadium alkoxide solution to the cathode active material composition layer in an inert atmosphere, and drying the resultant; and hydrolyzing the cathode precursor by exposing the preliminary cathode to moisture in ambient air, and vacuum drying the resultant.

According to another embodiment of the present invention, there is provided a method of improving the conductivity of a lithium composite oxide cathode active material of a lithium battery, the method comprising forming a coating of vanadium oxide on the cathode active material.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
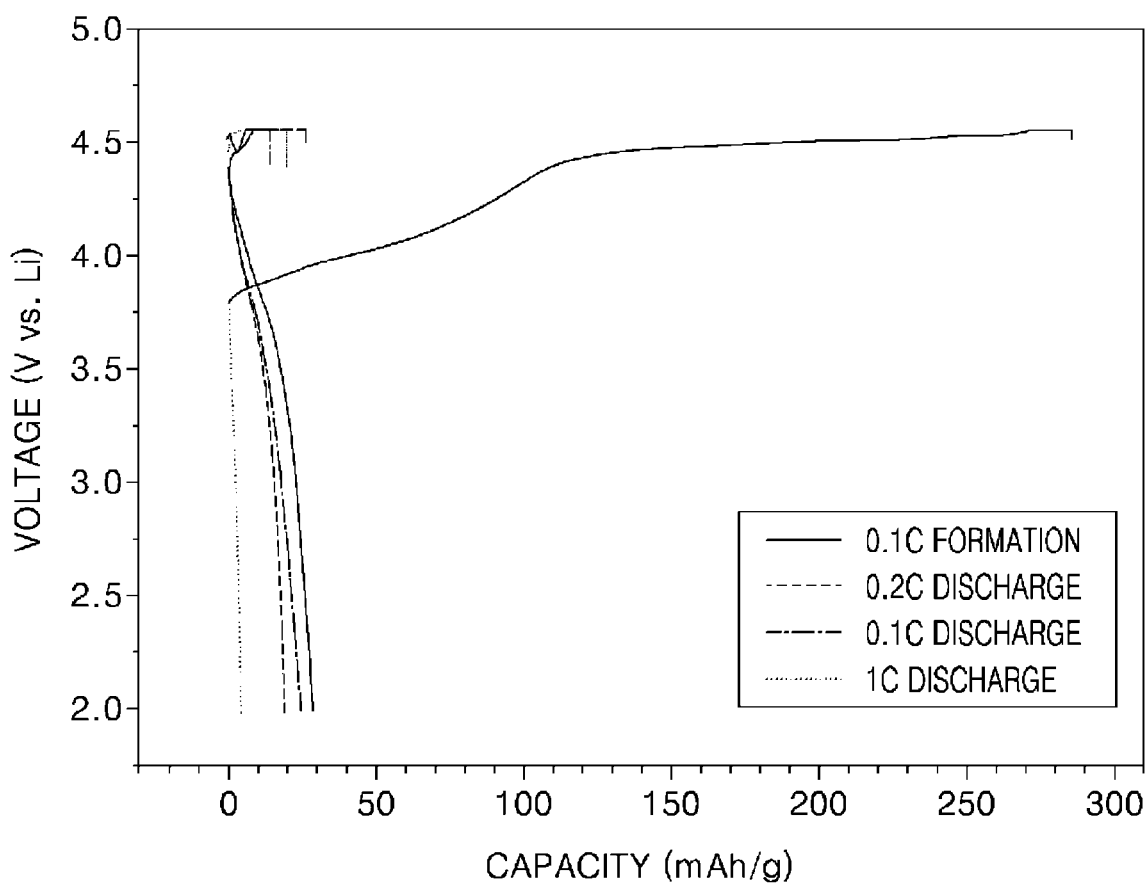
FIG. 1 is a graph illustrating capacity (mAh/g) and voltage changes according to current density of a cathode prepared according to Comparative Example 1.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In order to improve the electrochemical properties, such as, for example, the electrical conductivity, of a cathode, a cathode active material composition is coated with a vanadium oxide so that the conductivity of elements that form the cathode active material composition and the conductivity among the elements are improved. Thus, a high capacity cathode can be obtained.

The cathode active material composition includes a binder, a conducting agent, and a cathode active material, and is formed on at least one surface of a current collector, such as, for example, an Al current collector, to form a basic structure of a cathode. The vanadium oxide is applied to the cathode active material composition formed on the current collector in order to be coated on each of the components of the cathode active material composition, thereby improving the conductivity of the cathode.

The vanadium oxide used as a coating material in the cathode according to aspects of the present invention has excellent conductivity and high stability at high voltage, since the vanadium oxide is not structurally distorted and does not generate oxygen at a high voltage, and prevents an active material and an electrode from deteriorating during a high-temperature treatment after the coating since phase formation occurs at a low temperature. The vanadium oxide may be $VO_x$ ($2 \leq x < 2.5$) or $V_2O_5$, or more specifically, $V_2O_5$.

The amount of the vanadium oxide may range from 0.1 to 10 parts by weight, and preferably from 0.1 to 5 parts by weight based on 100 parts by weight of the cathode active material composition. If the amount of the vanadium oxide is less than 0.1 parts by weight, the conductivity improvement may be negligible. On the other hand, if the amount of the vanadium oxide is greater than 10 parts by weight, ion conductivity may be blocked.

The conductivity of the cathode is improved by coating the active material layer with the vanadium oxide, particularly, within the range between the maximum and minimum charge and discharge values of the vanadium oxide. The range of charge and discharge values may be about 1.5 to 4.0 V vs. Li/Li$^+$. Thus, the conductivity of a cathode having a driving voltage within the range above can be improved by the vanadium oxide. The cathode active material may be at least one selected from the group consisting of compounds represented by Formulae 1 to 4 below.

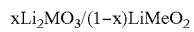

$$xLi_2MO_3/(1-x)LiMeO_2 \qquad \text{Formula 1}$$

wherein $0 < x < 1$,

M is at least one metal selected from the group consisting of Mn, Ti, and Zr, and Me is at least one metal selected from the group consisting of Ti, V, Cr, Mn, Fe, Co, Ni, Cu, Al, Mg, Zr, and B;

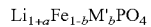

$$Li_{1+a}Fe_{1-b}M'_bPO_4 \qquad \text{Formula 2}$$

wherein $-0.1 < a < 0.1$, $0 \leq b \leq 1$, and

M' is at least one metal selected from the group consisting of Mn, Co, and Ni;

Formula 3

$$Li_{1+c}(Ni_{0.5}Mn_{0.5})_{1-d}Co_dO_2 \qquad \text{Formula 3}$$

wherein $-0.1 < c < 0.1$, and $0 \leq d \leq 1$;

$$Li_{1+e}Mn_{2-e}O_4 \qquad \text{Formula 4}$$

wherein $0 \leq e \leq 0.33$.

Among the cathode active materials of Formulae 1 to 4, the material of Formula 1, which is a solid solution complex, is desirable in terms of capacity.

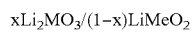

$$xLi_2MO_3/(1-x)LiMeO_2 \qquad \text{Formula 1}$$

wherein $0 < x < 1$, M is at least one metal selected from the group consisting of Mn, Ti, and Zr, and Me is at least one metal selected from the group consisting of Ti, V, Cr, Mn, Fe, Co, Ni, Cu, Al, Mg, Zr, and B.

In Formula 1, the variable x determines a molar ratio between Li$_2$MO$_3$ and LiMeO$_2$, and may range between 0 and 1 ($0 < x < 1$), or more specifically, between 0.21 and 0.6 ($0.1 < x < 0.6$).

Carbon black may be used as a conducting agent in addition to the cathode active material in the cathode active material composition. The binder may be a vinylidene fluoride/hexafluoropropylene copolymer, polyvinylidene fluoride, polyacrylonitrile, polymethylmethacrylate, polytetrafluoroethylene, a mixture thereof, or a styrene butadiene rubber-based polymer.

The ratio among the cathode active material, the conducting agent, and the binder may be within the range commonly used in the art, but the present invention is not limited thereto.

Any current collector for a cathode that is commonly used in lithium batteries can be used as the current collector on which the cathode active material composition coated with the vanadium oxide is formed. For example, an aluminum current collector may be used. The size and thickness of the current collector may be within the range that is commonly used in lithium batteries.

A cathode according to aspects of the present invention may be prepared according to the following process. First, a slurry including a binder, a conducting agent, a cathode active material, and an organic solvent is uniformly coated onto one surface of a current collector, and dried to evaporate the organic solvent, thereby forming a cathode active material composition layer on the current collector. Separately, vanadium alkoxide is dissolved in an organic solvent and the solution is injected into the cathode active material composition layer in an inert atmosphere. The resultant is dried naturally so that the vanadium alkoxide solution can uniformly soak the cathode active material composition layer. Then, the resultant, which may be referred to herein as a cathode precursor, is dried for a predetermined time to evaporate the organic solvent and is exposed to moisture in the ambient air, which results in hydrolysis of the vanadium alkoxide to form vanadium oxide. The resultant is vacuum dried at an elevated temperature to obtain a cathode in which the vanadium oxide is coated on the cathode active material composition.

The amount of the vanadium alkoxide solution applied to the cathode active material composition layer may be an amount that provides vanadium oxide in the range of from 0.1 to 10 parts by weight based on 100 parts by weight of the cathode active material composition.

The vanadium alkoxide in the vanadium alkoxide solution may be vanadium propoxide, vanadium isopropoxide, or the like, and the organic solvent may be an aliphatic carbonate such as dimethyl carbonate ethylmethyl carbonate, diethyl carbonate, and dipropyl carbonate; a cyclic carbonate such as dimethoxyethane, diethoxyethane, a fatty ester derivative, ethylene carbonate, propylene carbonate, and butylene carbonate; hexane; γ-butyrolactone; N-methyl pyrrolidone; acetone; alcohol; water; or a mixture thereof. The temperature for the vacuum drying of the cathode coated with the vanadium alkoxide may range from about 50 to 200° C., and argon may be used for the inert atmosphere. The cathode active material, the binder, and the conducting agent are as described above.

A lithium battery including a cathode according the aspects of the present invention may be prepared according to the following process. Similar to the preparation of the cathode described above, an anode is prepared by mixing an anode active material, a conducting agent, a binder, and a solvent to prepare a slurry for an anode active material. The slurry is directly coated onto a Cu current collector or is cast on a separate substrate and an anode active material film obtained therefrom is laminated on a Cu current collector to obtain an anode plate. The amounts of the anode active material, the conducting agent, the binder and the solvent may be those commonly used in lithium batteries.

Lithium metal, a lithium alloy, a carbonaceous material, or graphite is used as the anode active material. The conducting agent, the binder, and the solvent in the anode active material composition are the same as those described above with respect to the cathode active material composition. If desired, a plasticizer may be added to the cathode active material composition and the anode active material composition to produce pores in the electrode plates.

The cathode and the anode may be separated from each other by a separator. The separator may comprise any material that is commonly used in lithium batteries. A material having a low resistance to the movement of ions of the electrolyte and a good ability to absorb the electrolytic solution may be used. For example, the material may be a non-woven or woven fabric selected from the group consisting of a glass fiber, polyester, TEFLON, polyethylene, polypropylene, polytetrafluoroethylene (PTFE) and a combination thereof. More specifically, a lithium ion battery includes a windable separator composed of one of polyethylene, polypropylene, etc., and a lithium ion polymer battery includes a separator having an excellent ability to impregnate an organic electrolytic solution. The separator may be prepared using the following method.

A polymer resin, a filler, and a solvent are mixed to prepare a separator composition. The separator composition may be directly coated onto an electrode and dried to form a separator film. Alternatively, the separator composition may be cast onto a substrate and dried to form a separator film f on the substrate that is peeled off and laminated on an electrode.

The polymer resin is not particularly limited and may be any material that is commonly used in a binder of electrode plates. Examples of the polymer resin include a vinylidenefluoride/hexafluoropropylene copolymer, polyvinylidenefluoride, polyacrylonitrile, polymethylmethacrylate and a mixture thereof. In particular, a vinylidenefluoride/hexafluoropropylene copolymer containing 8 to 25% by weight of hexafluoropropylene can be used.

The separator is interposed between the cathode plate and the anode plate to form a battery assembly. The battery assembly is wound or folded and placed in a cylindrical or rectangular battery case. Then, the organic electrolytic solution according to aspects of the present invention is injected into the battery case to complete the lithium ion battery.

Alternatively, a battery assembly may be prepared in the form of a bi-cell and the organic electrolytic solution may be impregnated therein. Then, the resultant is placed in a pouch and sealed to complete the lithium ion polymer battery.

The organic electrolytic solution may include a lithium salt and a mixed organic solvent including a high dielectric constant solvent and a low boiling point solvent.

The high dielectric constant solvent may be any solvent that is commonly used in the art, such as, for example, a cyclic carbonate such as ethylene carbonate, propylene carbonate, and butylene carbonate; or γ-butyrolactone.

In addition, the low boiling point solvent may be any solvent that is commonly used in the art, such as, for example, an aliphatic carbonate such as dimethyl carbonate, ethylmethyl carbonate, diethyl carbonate, and dipropyl carbonate; dimethoxyethane; diethoxyethane; or a fatty acid ester derivative.

The volumetric ratio of the high dielectric constant solvent to the low boiling point solvent may be 1:1 to 1:9. When the ratio is not within this range, the discharge capacity and charge/discharge cycle life of the battery may degrade.

The lithium salt may be any lithium salt that is commonly used in lithium batteries and may include at least one compound selected from the group consisting of $LiClO_4$, $LiCF_3SO_3$, $LiPF_6$, $LiN(CF_3SO_2)_2$, $LiBF_4$, $LiC(CF_3SO_2)_3$ and $LiN(C_2F_5SO_2)_2$.

The concentration of the lithium salt in the organic electrolytic solution may range from 0.5 to 2.0 M. If the concentration of the lithium salt is less than 0.5 M, the conductivity of the electrolytic solution may be low, thereby degrading the performance of the electrolytic solution. On the other hand, if the concentration of the lithium salt is greater than 2.0 M, the viscosity of the electrolytic solution may be high, and thus the mobility of lithium ions may be low.

Aspects of the present invention will now be described in greater detail with reference to the following examples. The following examples are for illustrative purposes only and are not intended to limit the scope of the invention.

COMPARATIVE EXAMPLE 1

$Li_{1.2}Ni_{0.16}Co_{0.08}Mn_{0.56}O_2$ synthesized by a coprecipitation method was used as an active material. The active material was mixed with a carbon conducting agent (SUPER P carbon black) in a weight ratio of 94:3, and a binder solution in which PVDF was dissolved in N-methyl pyrrolidone (NMP) was added to the mixture so that a weight ratio of the active material: the carbon conducting agent: the binder was 94:3:3 to prepare a slurry. The slurry was coated onto a 15 μm thick Al foil and dried to prepare a cathode. After a further vacuum drying, a coin cell (CR2016 type) was prepared, and charge and discharge characteristics of the coin cell were measured. Lithium was used to form a counter electrode, and 1.3M $LiPF_6$ in EC:DEC(3:7) was used as an electrolyte. The charge and discharge characteristics were measured by performing a charge at a C/10 current density, a discharge at a C/10 current density, a charge at a C/2 current density and a discharge at a C/5 current density, a charge at a C/2 current density and a discharge at a C/10 current density, and a charge at a C/2 current density and a discharge at a 1 C current density in a voltage section ranging from 2.0 to 4.55V. The results of the measurements of charge/discharge characteristics are shown in FIG. 1.

EXAMPLE 1

Figure 2:
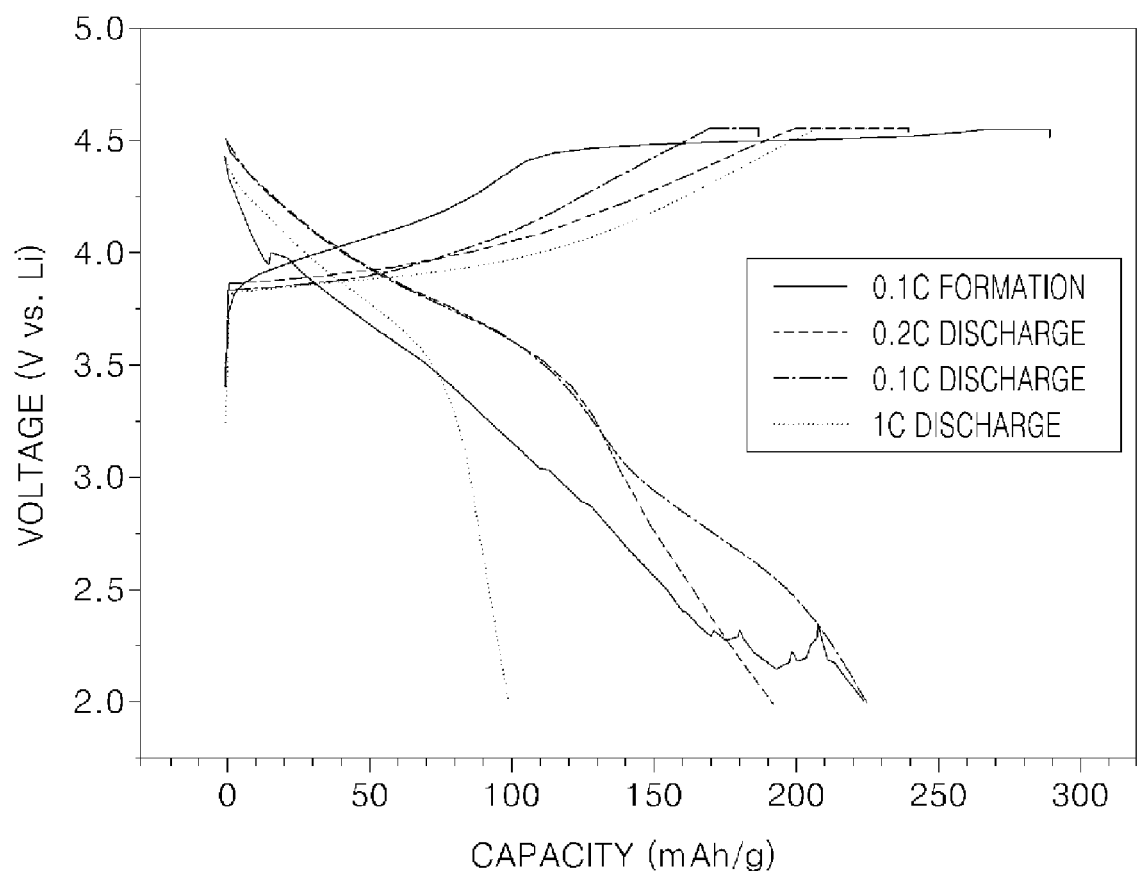
FIG. 2 is a graph illustrating capacity (mAh/g) and voltage changes according to current density of a cathode prepared according to Example 1.

$Li_{1.2}Ni_{0.16}Co_{0.08}Mn_{0.56}O_2$ synthesized by a coprecipitation method was used as an active material. The active material was mixed with a carbon conducting agent (SUPER P carbon black) in a weight ratio of 94:3, and a binder solution in which PVDF was dissolved in NMP was added to the mixture so that a weight ratio of the active material: the carbon conducting agent: the binder was 94:3:3 to prepare a slurry. The slurry was coated onto a 15 μm thick Al foil and dried, and a vanadium alkoxide solution was injected thereto. The vanadium alkoxide solution was prepared by mixing 2 ml of isopropyl alcohol and 0.1 ml of vanadium isopropoxide. The vanadium alkoxide solution was applied to the cathode active material layer in a glove box using a micro pipette in an Ar atmosphere and the cathode active material layer was dried naturally. After drying, the cathode was exposed to moisture in the air to hydrolyze the vanadium alkoxide, and then vacuum drying was performed at 120° C. for 2 hours. Then, a coin cell battery was prepared and the charge and discharge characteristics of the battery were measured under same conditions used in Comparative Example 1. The results of the measurements of charge/discharge characteristics are shown in FIG. 2.

COMPARATIVE EXAMPLE 2

Figure 3:
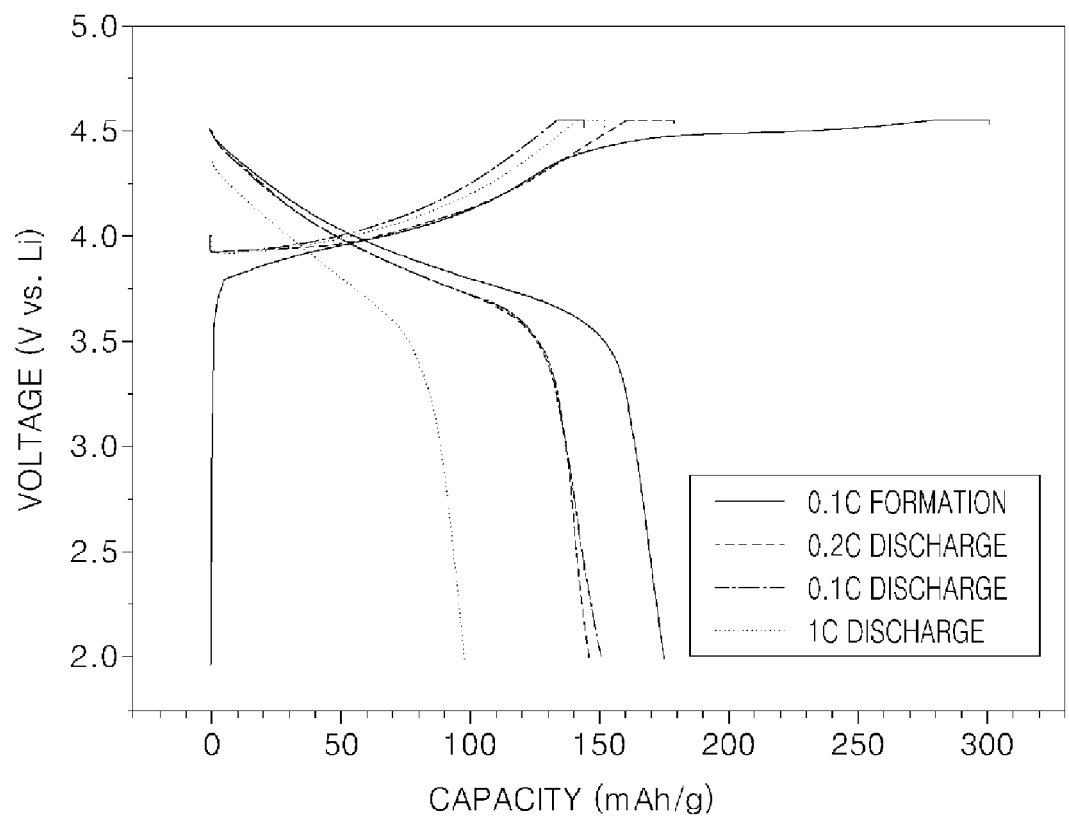
FIG. 3 is a graph illustrating capacity (mAh/g) and voltage changes according to current density of a cathode prepared according to Comparative Example 2.

A cathode and a coin cell were prepared in the same manner as in Comparative Example 1, except that $Li_{1.167}Ni_{0.2}Co_{0.1}Mn_{0.5333}O_2$ synthesized by a coprecipitation method was used instead of the $Li_{1.2}Ni_{0.16}Co_{0.08}Mn_{0.56}O_2$ used in Comparative Example 1. The charge and discharge characteristics were measured under the same conditions used in Comparative Example 1. The results of the measurements of charge/discharge characteristics are shown in FIG. 3.

EXAMPLE 2

$Li_{1.167}Ni_{0.2}Co_{0.1}Mn_{0.533}O_2$ synthesized by a coprecipitation method was used as a active material. The active material was mixed with a carbon conducting agent (SUPER P carbon black) in a weight rate of 94:3, and a binder solution in which PVDF was dissolved in NMP was added to the mixture so that a weight ratio of the active material: the carbon conducting agent: the binder was 94:3:3 to prepare a slurry. The slurry was coated onto a 15 μm thick Al foil and dried, and a vanadium alkoxide solution was injected thereto. The vanadium alkoxide solution was prepared by mixing 2 ml of dimethyl carbonate and 0.1 ml of vanadium isopropoxide. The vanadium alkoxide solution was applied to the cathode active material layer in a glove box using a micro pipette in an Ar atmosphere and the cathode active material was dried naturally. After drying, the cathode was exposed to moisture in the air to hydrolyze the vanadium alkoxide, and then vacuum drying was performed at 120° C. for 2 hours. The charge and discharge characteristics were measured under the same conditions shown in Comparative Example 1. The results of the measurement of charge/discharge characteristics are shown in FIG. 4.

Referring to FIG. 1 which shows the results of Comparative Example 1, an over voltage was applied to $Li_{1.2}Ni_{0.16}Co_{0.08}Mn_{0.56}O_2$, the cathode active material, during the initial charge, and the coin cell was almost electrochemically deactivated from the next discharge. That is, the charging amount was almost 300 mAh/g, but the discharging amount was equal to or less than 30 mAh/g, thereby representing efficiency of about 10%. Thus, an oxide including lithium in the amount of 20% in a transition metal layer seems to be impractical for use in a battery unless a treatment improving conductivity is performed or an electrode having a high conductivity is used.

FIG. 2 illustrates the charge and discharge characteristics when a vanadium oxide is coated on the same electrode of FIG. 1. Referring to FIG. 2, the discharge capacity was increased to about 225 mAh/g at a C/10 current density, to about 193 mAh/g at a C/5 current density, and to about 100 mAh/g at a 1 C current density.

Figure 4:
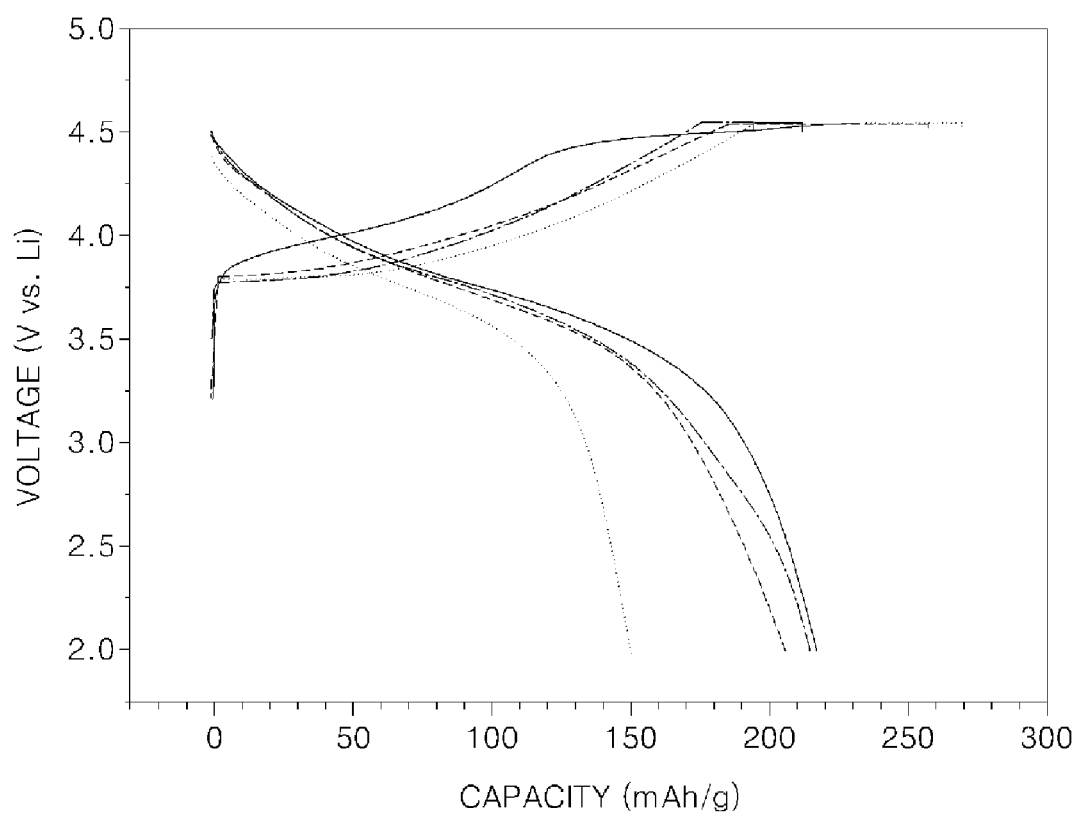
FIG. 4 is a graph illustrating capacity (mAh/g) and voltage changes according to current density of a cathode prepared according to Example 2.

FIGS. 3 and 4 illustrate effects of a vanadium oxide coating with a smaller amount of lithium compared to the compositions used in FIGS. 1 and 2 (Comparative Example 1 and Example 1). In Example 2 and Comparative Example 2, $Li_{1.167}Ni_{0.2}Co_{0.1}Mn_{0.533}O_2$, which has higher conductivity than $Li_{1.2}Ni_{0.16}Co_{0.08}Mn_{0.56}O_2$ used in Example 1 and Comparative Example 1, was used. The charge and discharge capacity was about 150 mAh/g at a C/10 current density, about 146 mAh/g at a C/5 current density, and about 98 mAh/g at a 1 C current density, as shown in FIG. 3 (Comparative Example 2). When vanadium oxide was coated onto the cathode active material according to Example 2, the discharge capacity was 228 mAh/g at a C/10 current density, 219 mAh/g at a C/5 current density, and 169 mAh/g at a 1 C current density, as shown in FIG. 4. The overvoltage during the charge was increased in FIG. 3, but decreased in FIG. 4. Thus, it can be seen that the vanadium oxide coating can contribute to improve the conductivity of an electrode, thereby increasing the capacity of the electrode.

A scanning electron microscope (SEM) image was obtained of a cross-section of a cathode active material in a cathode prepared according to Example 1. From the SEM image and a magnification of the SEM image, it was confirmed that the conducting agent, the binder, and the cathode active material in the cathode active material were coated with the vanadium oxide.

According to aspects of the present invention, the conductivity of a cathode can be improved by coating the cathode active material layer with the vanadium oxide. Thus, the cathode can have a high capacity and can be efficiently used in a lithium battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cathode comprising:
   a current collector;
   a first layer on a surface of the current collector, the first layer comprising a cathode active material composition comprising a conducting agent, a binder, and a cathode active material; and
   a second layer on a surface of the first layer, the second layer comprising a vanadium oxide of the formula $VO_x$ wherein $2 \leq x < 2.5$.

2. The cathode of claim 1, wherein the amount of the vanadium oxide ranges from 0.1 to 10 parts by weight based on 100 parts by weight of the cathode active material composition.

3. The cathode of claim 1, wherein the cathode active material is at least one selected from the group consisting of the compounds represented by Formulae 1 to 4 below:

$$xLi_2MO_3/(1-x)LiMeO_2 \qquad \text{Formula 1}$$

wherein $0 < x < 1$,
M is at least one metal selected from the group consisting of Mn, Ti, and Zr, and
Me is at least one metal selected from the group consisting of Ti, V, Cr, Mn, Fe, Co, Ni, Cu, Al, Mg, Zr, and B;

$$Li_{1+a}Fe_{1-b}M'_bPO_4 \qquad \text{Formula 2}$$

wherein $-0.1 < a < 0.1$,
$0 \leq b \leq 1$, and
M' is at least one metal selected from the group consisting of Mn, Co, and Ni;

$$Li_{1+c}(Ni_{0.5}Mn_{0.5})_{1-d}CO_dO_2 \qquad \text{Formula 3}$$

wherein $-0.1 < c < 0.1$, and
$0 \leq d \leq 1$; and $$Li_{1+e}Mn_{2-e}O_4 \qquad \text{Formula 4}$$

wherein $0 \leq e \leq 0.33$.

4. The cathode of claim 1, wherein the cathode active material is a compound represented by Formula 1 below:

$$xLi_2MO_3/(1-x)LiMeO_2 \qquad \text{Formula 1}$$

wherein $0 < x < 1$,
M is at least one metal selected from the group consisting of Mn, Ti, and Zr, and
Me is at least one metal selected from the group consisting of Ti, V, Cr, Mn, Fe, Co, Ni, Cu, Al, Mg, Zr, and B.

5. The cathode of claim 4, wherein Me is at least one metal selected from the group consisting of Cr, Mn, Co, and Ni.

6. The cathode of claim 4, wherein x ranges from 0.1 to 0.6.

7. A cathode of a lithium battery comprising:
   a first layer comprising a cathode active material composition comprising a lithium metal oxide or lithium metal oxide composite, a binder and a conductive agent; and
   a second layer coated on the first layer and comprising a vanadium oxide of the formula $VO_x$ wherein $2 \leq x < 2.5$.

8. A lithium battery comprising:
   the cathode of claim 1;
   an anode; and
   an organic electrolytic solution.

9. The lithium battery of claim 8, wherein the anode comprises an anode active material, a conducting agent, a binder, and a solvent.

10. The lithium battery of claim 9, wherein the anode active material is selected from the group consisting of lithium metal, a lithium alloy, a carbonaceous material, and graphite.

11. The lithium battery of claim 8, further comprising a separator.

12. The lithium battery of claim 8, wherein the organic electrolytic solution comprises a lithium salt, and a mixed organic solvent including a high dielectric constant solvent and a low boiling point solvent.

13. The lithium battery of claim 12, wherein the high dielectric constant solvent is selected from the group consisting of:
   cyclic carbonates selected from the group consisting of ethylene carbonate, propylene carbonate, and butylene carbonate;
   γ-butyrolactone; and
   a mixture thereof.

14. The lithium battery of claim 12, wherein the low boiling point solvent is selected from the group consisting of dimethyl carbonate, ethylmethyl carbonate, diethyl carbonate, dipropyl carbonate, dimethoxyethane, diethoxyethane, a fatty acid ester derivative, and a mixture thereof.

* * * * *

UNITED STATES PATENT AND TRADEMARK OFFICE
CERTIFICATE OF CORRECTION

PATENT NO. : 7,968,232 B2  
APPLICATION NO. : 12/183102  
DATED : June 28, 2011  
INVENTOR(S) : Kyu-sung Park et al.

It is certified that error appears in the above-identified patent and that said Letters Patent is hereby corrected as shown below:

In the Claims

Column 9, Claim 3, line 34,      Delete

"$Li_{1+c}(Ni_{0.5}Mn_{0.5})_{1-d}CO_dO_2$"

Formula 3.      Insert

-- $Li_{1+c}(Ni_{0.5}Mn_{0.5})_{1-d}Co_dO_2$ --

Signed and Sealed this
Twenty-fifth Day of September, 2012

David J. Kappos
*Director of the United States Patent and Trademark Office*